United States Patent [19]
Silva et al.

[11] Patent Number: 4,867,989
[45] Date of Patent: Sep. 19, 1989

[54] CHEWING GUM MINERAL SUPPLEMENT

[75] Inventors: Jose N. Silva, Astoria, N.Y.; Jose F. Zamudio-Tena, Morristown; Robert J. Huzinec, Kenvil, both of N.J.

[73] Assignee: Warner-Lambert Company, Morris Plains, N.J.

[21] Appl. No.: 905,732

[22] Filed: Sep. 9, 1986

[51] Int. Cl.$^4$ .............................................. A23G 3/30
[52] U.S. Cl. .......................................... 426/5; 426/74; 426/291; 426/292; 426/303; 424/48; 424/144; 424/145; 424/440; 424/441; 424/639; 424/640
[58] Field of Search ...................... 426/74, 5, 291, 303, 426/305, 292; 424/48, 144, 145, 441, 440

[56]  References Cited
U.S. PATENT DOCUMENTS

| | | | |
|---|---|---|---|
| 2,259,543 | 10/1941 | Billins | 426/74 |
| 2,480,086 | 8/1949 | Moss et al. | 426/74 |
| 3,681,087 | 8/1972 | Johnson | 426/5 |
| 4,214,996 | 7/1980 | Buddemeyer | 426/74 X |
| 4,238,510 | 12/1980 | Cheruhuri et al. | 426/5 |
| 4,317,838 | 3/1982 | Cheruhuri et al. | 426/5 |
| 4,681,766 | 7/1987 | Huzinec | 426/5 |
| 4,753,790 | 6/1988 | Silva et al. | 426/5 |

FOREIGN PATENT DOCUMENTS 1063255  4/1986  Japan ..................... 426/5

Primary Examiner—Jeanette Hunter
Attorney, Agent, or Firm—Gary M. Nath; Henry C. Jeanette; Charles A. Gaglia, Jr.

[57] ABSTRACT

A chewable mineral supplement which comprises: a chewing gum composition coated with an outer shell containing layers of a mineral compound and a coating syrup and wherein the mineral compound has an average a particle size of about 5 to about 75 microns to impart good "mouthfeel" to the chewable mineral supplement.

33 Claims, No Drawings

CHEWING GUM MINERAL SUPPLEMENT

This invention relates to a chewable mineral supplement and more particularly to a chewable mineral supplement comprising a chewing gum composition coated with an outer shell containing alternating layers of a mineral compound and a coating syrup. The invention also relates to a method by which the mineral supplements are prepared.

In the past, chewing gums in the form of shaped centers or cores, e.g. pellet gums, have been coated both with sugar and sugarless coatings to produce candy-like, crunchy outer taste in the mouth with a chewable gum center portion. Conventionally, the core is a soft chewing gum portion, whereas the coating is crunchy or hard. In the case of sugarless coatings, aqueous solutions of xylitol, mannitol, maltitol and sorbitol, known as syrups, have been primarily employed. Such syrups may contain additives such as moisture absorbing compounds, anti-adherent compounds, dispersing agents, film forming agents, binders and the like.

U.S. Pat. No. 4,317,838 discloses a method for forming a sugarless coating on centers of chewing gum or other comestibles which includes the steps of applying to the centers a coating syrup which contains a sweetener such as sorbitol and/or other non-sugar sweetener, an adhesion or binder component such as gum arabic and a film forming component, an anti-adherent or filler component, and a dispersing agent to thereby coat the centers with the coating syrup. A dusting mix including one or more sweeteners, such as employed in the coating syrup, in powdered form, and a moisture absorbing component, an anti-adherent component and a dispersing agent are also employed. See also UK Patent Application GB 2079129A which describes a similar method which further comprises applying a second coating syrup to smooth out the coating of the centers and provides a shine thereto, which second coating generally includes ingredients similar to those present in the dusting mix but dispersed in water.

One of the problems associated with forming coatings from these syrups is lumping and flaking of the finished coating rendering them unacceptable. The prior art has failed to disclose an effective coating or process to remedy this problem. Similar to the coating technology, the use of mineral supplements to treat human illness is well known. A variety of illnesses are caused by specific mineral deficiencies. Several of these are discussed below.

A deficiency in calcium levels may result in convulsions, tetany, behavioral and personality disorders, mental and growth retardation, and bone deformaties.

Phosphorous is essential for most metabolic processes. Symptoms of phosphate deficiency include weakness, anorexia, bone demineralization, and hypocalcemia.

Magnesium is essential for the functioning of a number of critical enzymes including enzymes involved with ATP-dependent phosphorylation, protein synthesis, and carbohydrate metabolism. Magnesium deficiency also causes apathy, depression, delirium, and convulsions.

Lithium has been found useful in the treatment of manic-depressive illness, as a mood stabilizer, and as an antidepressive.

Sodium in the form of salts (sodium chloride) plays the major role in control of distribution of water in the body. Salt deficiency results in a diminution in extracellular space, and induces profound changes in the circulatory system. Salt deficiency leads to symptoms such as mental depression with drowsiness, apath, anorexia, nausea and vertigo.

Potassium is the important cationic constituent of the intracellular fluid. Potassium deficiency may result in kidney damage and vacuolization of the collection tubules. Potassium deficiency is characterized by mental changes (hallucinations, loquacity) an animated facial expression and limpness of the extremities. The muscles become soft and weak.

Iron plays an important role in oxygen and electron transport. Symptoms of iron deficiency are fatigability, weakness and lassitude. Other symptoms of anemia include pallor, dyspnea on exertion, palpitation and a feeling of exhaustion.

Zinc activates a number of enzymes concerned in protein metabolism as well as some enolases and lecithinases. There is evidence to suggest that zinc deficiency may cause dwarfism and hypogonadism.

A general discussion of the therapeutic uses of mineral compounds may be found in A. Grollman & E. F. Grollman, Pharmacology and Therapeutics, 7th Ed. Lea & Febiger, Philadelphia, Pa. at pages 858–873, 876, 877, 907–915.

A large number of commercial products are available which contain mineral supplements. Most of these products are available as combination products with vitamins. Iron supplements are generally an exception as a number of iron supplements are available as a single mineral supplement.

Hard chewable tablets offer the ability to deliver large doses of mineral supplements, however, the resultant products have a gritty mouthfeel and a taste dominated by the often salty, or bitter taste of the mineral compound. Chewable dosage forms containing large amounts of calcium compounds have also been developed in the area of antacids. Exemplary tablets contain 500 mg. to 750 mg. of calcium carbonate. Non-chewable calcium supplement tablets are also known to contain 375 mg. of calcium carbonate per tablet to 1200 mg. of calcium as calcium carbonate.

U.S. Pat. No. 4,545,989 to Becker, et al. discloses a soft nougat type antacid composition. The Becker, et al. product may contain calcium carbonate up to about 20% by weight as the antacid compound. To prepare a non-chalky nougat based product, Becker, et al. requires the addition of antacid to a whipped frappe portion of the soft candy composition. The chalky mouth taste is avoided by coating the antacid particles having a size up to 1.5 microns with the frappe mixture prior to forming the nougat.

U.S. Pat. No. 4,582,709 to Peters discloses a chewable mineral supplement and process for making the same. The product comprises from about 3 to about 40% by weight of a mineral compound, and from about 1.5 to about 6% by weight edible polyol admixed in a soft, nougat candy base.

While the products described above may be able to deliver mineral supplements, they suffer from a variety of consumer acceptance problems. The chewable tablets are large and generally leave a chalky and or gritty sensation in the mouth. Non-chewable tablets and capsules require multiple unit dosages, i.e., 2 to 4 tablets or capsules per administration. More potent non-chewable tablets or capsules are physically so large as to be objectionable to the consumer. Additionally, none of these efforts have been directed to preparing a chewing gum product which may be individually coated with different mineral compounds and conveniently used. Accordingly an alternate method for supplying a mineral compound is needed.

In accordance with the present invention it has been unexpectedly discovered that a chewable mineral supplement could be prepared in a "Chiclets" (Trademark of Warner-Lambert Company) type format so that the product retains its smooth coat, shine and initial crunch along with avoiding the initial chalky mouth feel commonly associated with mineral compounds. More particularly the invention comprises a chewing gum composition coated with an outer shell containing alternating layers of (1) a mineral compound and (2) a coating syrup and wherein the mineral compound has an average particle size of about 5 to about 75 microns to impart good "mouthfeel" to the chewable mineral supplement.

In another embodiment, the invention involves a process for preparing a chewable mineral supplement which comprises the steps of applying to a shaped chewing gum composition alternating layers of a powdered mineral supplement having an average particle size of about 5 to about 75 microns and a coating syrup containing a sweetener, film forming agent and water. The application of alternating coatings is repeated as many times as necessary to build up the desired mineral coating weight and thickness on the chewing gum piece.

The mineral supplements of the invention comprises a chewing gum composition and an outer crunchy shell. The chewing gum portion is comprised of a variety of well-known ingredients standard in the art. The term "chewing gum piece" as used herein refers to a shaped chewing gum composition which contains the outer shell composed of a coating syrup and mineral compound.

The chewing gum pieces of this invention have the outer shell formulated to provide the desired level of mineral supplement. By having the mineral compound in the outer shell, a very precise amount of delivery of the mineral compound can be achieved during chewing of the gum piece. Where most mineral supplement products provide a chalky taste, especially antacid products, the chewing gum pieces of this invention provide a smooth, non-chalky release of the mineral compound since the materials are evenly dispersed within the outer shell. In addition, by employing alternating coating steps, a precise amount of mineral supplement may be applied to the chewing gum, and subsequently, the precise release of material achieved when the product is chewed.

The mineral compound may be selected from a wide range of compounds that provide a source of absorbable minerals when ingested. Suitable compounds are preferably organic or inorganic salts that render the compounds absorbable herein. Exemplary salts may be selected from the group consisting of salts of lithium, sodium, potassium, magnesium, calcium, phosphorous, iron, zinc and mixtures thereof. The mineral compounds may be used singly or in combination providing there is no reaction between the ingredients once the chewing gum piece is prepared.

One particularly preferred mineral compound is calcium which calcium compound may be selected from a wide range of sources such as a compound selected from the group consisting of calcium gluconate, calcium chloride, calcium lactate, calcium phosphate, monobasic calcium phosphate, calcium carbonate, calcium tartrate, calcium glycerophosphate, calcium levulinate, calcium hypophosphate, calcium sulfate, calcium gluceptate, calcium chelates, calcium amino acid chelate, ground limestone, ground oyster shells and mixtures thereof. Preferably the calcium compound is calcium carbonate.

The presence of calcium in the outer shell of the product affords a preferred aspect of this invention. It should be recognized that chewing gum products have generally been unable to provide a uniform and consistent release of calcium when the products were chewed. In particular the use of calcium carbonate as a filler in chewing gum compositions is well known not to provide a readily available source of calcium since this filler becomes entrapped or comingled with the remaining chewing gum constituents. The present use of fine powder calcium in the outer shell renders the product extemely effective as an antacid source and provides high levels of calcium to obtain ACP values above 50.

Compounds used to provide a mineral supplement of lithium include organic and inorganic salts wherein the anion is chloride, carbonate, citrate, sulfate, bromide and mixtures thereof.

Compounds useful in providing a mineral supplement of zinc include inorganic and organic salts wherein the anionic portion of the salt is carbonate, chloride, citrate, and mixtures thereof.

Compound useful in providing a mineral supplement of phosphorous include salts wherein the anionic portion is a phosphate and the cationic portion is sodium, potassium, magnesium, iron, calcium, lithium, zinc and mixtures thereof.

Compounds useful in providing a mineral supplement of potassium include inorganic and organic salts wherein the anionic portion of the salt is acetate, bicarbonate, bitartrate, bromide, carbonate, chloride, citrate, gluconate, phosphate monobasic, phosphate dibasic, phosphate tribasic, sulfate, tartrate and mixtures thereof.

Compounds used to provide a mineral supplement of iron include organic and inorganic salts and chelates of iron such as reduced iron, ferrous sulfate, iron ammonium citrate, ferrous carbonate, ferrous chloride, ferrous fumarate, ferroglycine sulfate, ferronascin, ferrous carbonate mass, ferrous carbonate saccharated, ferrous citrate, ferrous gluconate, ferrous lactate, ferrous sulfate, ferrous succinate, iron cheates, iron chelate with magnesium trisilicate and mixtures thereof.

Compounds used to provide a mineral supplement of sodium include organic and inorganic salts of sodium wherein the anionic portion of the salt is acetate, ascorbate, bicarbonate, carbonate, chloride, citrate, hypophosphite, lactate, phosphate monobasic, phosphate dibasic, phosphate tribasic, sulfate, tartarate and mixtures thereof.

Compounds used to provide a mineral supplement of magnesium include organic and inorganic salts of magnesium wherein the anionic portion of the salt is acetate, carbonate hydroxide, chloride, citrate, dibasic citrate, hydroxide, lactate, oxide, phosphate monobasic, phosphate dibasic, trisilicate, sulfate as well as the composition formed as the co-precipitated gel of aluminum hydroxide and magnesiium carbonate, aluminum magnesium silicate, aluminum magnesium hydroxide and mixtures thereof.

The mineral compounds are incorporated into the outer shell in particulate form. The particle size while being critical may vary depending upon the particular mineral source but must be of an adequate micronized size to enable incorporation into the outer shell without exhibiting a sandy mouthfeel. Exemplary particle size ranges may be from about 5 to about 75 microns and preferably from about 10 to about 30 microns and preferably from about 10 to about 50 microns. Larger particle sizes, particularly for calcium carbonate, are not useable in this invention. Such materials result in an outer shell having a coarse texture, the piece is not smooth but is rough, the coating tends to become agglomerated during processing and does not result in a uniform coat and when not uniform the coating tends to peel off.

The mineral compound is present in the outer shell in an amount from about 5 to about 60%, and preferably about 20 to about 40% by weight of the outer shell. The lower limit for the mineral compound is determined by the minimum therapeutic dose. For the compounds considered herein, the lower limit is considered to be about 5% by weight. It is, however, possible to have lower mineral compound concentrations used in the inventive formulatons. Mineral compound concentrations greater than about 60%, however, are not useable since they result in a dry, chalky, gritty product and may result in a cracked or peeled product.

In addition to particle size criticality, it is also critical to maintain a ratio of coating syrup to mineral compound of about 1:0.5 to 1.5 parts by weight, respectively, in the outer shell. It has been found that when the coating syrup is used at higher ratios, the syrup washes off prior layers of mineral compound during the alternating coating procedure. Likewise, at higher mineral compound levels, there is insufficient tack or stickiness available between the coating syrup and the chewing gum composition to retain the higher amounts of mineral compound being added.

When applying the mineral compound to a gum piece previously contacted with the coating syrup which must possess a sticky surface, the surface of the gum piece is built up by increasing the coatings. When the mineral compound adheres to the product it is important not to remove it from the surface. In order to avoid this the coating syrup applications should not exceed the amount of mineral compound when the alternating layers are being applied. Accordingly, coating ingredients must be kept within the particular ratios.

In a preferred embodiment, it has been found acceptable to employ a coating syrup having a Baumé value from about 30 to about 40. While not being critical, the initial syrup coatings may be at the higher Baumé values to enable initial sealing and coating of the chewing gum composition and efficient layering and co-crystallization with the mineral compound within the coating syrup. Ratios of coating syrup to mineral compound may preferably vary from 1:0.5 to 1 during the initial coatings. Subsequent applications of coating syrup may be at lowered Baumé values to aid in formation of a smooth surfaced product and at higher mineral compound levels. Such ratios of coating syrup to mineral compound may preferably vary from 1:1 to 1.5.

The application of alternating layers of coating syrup and mineral compound is critical to the invention to prepare a "Chiclets" product that retains its smooth coat, shine and initial crunch while avoiding an initial chalky mouthfeel. The coating syrup functions as the support structure to hold the mineral compound as well as a means to seal the surface of the chewing gum composition by building a wall which will receive the applications of active ingredient. The coating syrup applications should be in close relation to the applications of mineral compound.

The coatings from the coating syrup and mineral compound are preferably applied by pan coating, although other conventional techniques may be useful. In pan coating methods, chewing gum pellet cores or other shapes are placed in a revolving coating pan and dedusted using cool dry air. The coating syrup is heated to about 70° and 85° C. and a portion thereof added to the revolving pan until the desired amount or thickness of coating is deposited on the chewing gum piece. Before applying subsequent alternate layers of coating syrup, the syrup is allowed to dry to a sticky consistency by gently flowing warm air (approximately 25° to 45° C.) over the chewing gum piece. Once a sticky texture is achieved, usually from 30 seconds to 3 minutes, a portion of the powdered mineral compound is added to the revolving pan within the ratios described above. Revolving is continued whereupon the mineral compound becomes layered or stuck to the chewing gum piece upon the coating syrup. Dispersing is usually continued for a period of 10 seconds to 2 minutes, that is until a uniform product is obtained. Thereafter the piece is dried with air, again at a temperature of about 25° to about 45° C. This procedure is repeated until the desired coating weight is obtained. For example, when coating chewing gum with micronized calcium carbonate, the applications of coating syrup and calcium carbonate are repeated at least 10 times. Once the coating procedure has been completed, the chewing gum piece may be optionally coated with a polishing coat such as with candilillia wax, carnauba wax, shellac and the like and packaged for storage or shipment.

Prior to its addition, the mineral compound may be dried to aid with adhesion and avoid the compound from being peeled off.

The coating syrup of the invention contains three essential ingredients; sweetener, film forming agent and water.

The sweetener may be selected from a wide variety of sweeteners capable of forming a syrup having the requisite Baumé value of 30 to 40 and is preferably selected from the group consisting of sucrose, fructose, maltose, xylitol, sorbitol, mannitol and mixtures thereof. The sweetener is employed in amounts of about 60 to about 81.9% and preferably 65 to 70% by weight of the coating syrup. Higher or lower amounts should be used since they result in formulations having Baumé values which are not useable in this invention.

The film forming agents aid in creating a film layer of the coating syrup and thus protect the surface of the chewing gum core. The film forming agent is used in amounts of about 0.1 to about 5% by weight of the coating syrup and preferably in amounts of about 2 to about 5% by weight. Amounts above about 5% result in a syrup that is too thick and forms lumps when being coated on the piece. Amounts below about 0.1% do not result in an effective film coating on the piece.

The film forming agents utilized in the present invention include cellulose, cellulose derivatives, starches, carbohydrates, gums, polyolefins, polyesters, vinyl polymers, gelatin, zein, and mixtures thereof. The foregoing materials include both water-soluble and water-insoluble agents, that may all be used successfully.

More particularly, the coating materials useful in the present invention include cellulose, cellulose derivatives such as cellulose ethers and cellulose esters, including methyl cellulose, ethyl cellulose, cellulose nitrate, cellulose acetate phthalate, carboxymethylcellulose, and hydroxyethylcellulose. Carbohydrates may include arabinogalactan, dextrans, starch, hydrolyzed starch, modified and natural starches and others; polyolefins include polyethylene and vinyl polymers include polymethacrylates, polyamides, ethylene-vinylacetate copolymers, and polyvinylpyrrolidone.

Suitable resins gums may include gum arabic, shellac, tahla, xanthan gum, locust bean gum and carrageenan. The invention is not limited to these materials, however, and contemplates the inclusion of all of the materials set forth above.

Water is employed in amounts of about 18% to about 38% by weight of the coating syrup and preferably about 25 to about 30% by weight. Higher amounts increases drying time, increases the number of coatings needed to obtain a specific coating level and tends to wash off previously applied mineral compound. Lower levels render the syrup too thick for use.

In carrying out the method of the invention, the mineral compound cannot be previously dispersed within the coating syrup but must be added separately and in different layers. This procedure is essential to obtain a smooth surfaced piece that is capable of releasing its active ingredient during chewing.

The syrup component, however, may include other additives such as moisture absorbing compounds, antiadherent compounds, dispersing agents and film forming agents.

The moisture absorbing compounds suitable for use in the coating syrups include mannitol or dicalcium phosphate. Examples of useful anti-adherent compounds, which may also function as a filler, include talc and magnesium trisilicate. These ingredients may be employed in amounts of about 0.5% to about 5% by weight of the syrup.

Examples of dispersing agents which may be employed in the coating syrup include titanium dioxide, talc or other anti-adherent compounds as set forth above.

The outer shell of the present invention may also optionally include absorption enhancers. Absorption enhancers are a group of compounds which facilitate more complete and/or more raid absorption of the mineral compound by the human body. In the case of calcium, such absorption enhancers include but are not limited to vitamin D, lysine, arginine, calcitrol, lactose and mixtures thereof.

Preferred absorption enhancers for calcium are vitamin $D^2$, vitamin $D^3$ and mixtures thereof. An absorption enhancer for iron is ascorbic acid. The absorption enhancer may be used in varying amounts well within the perview of the ordinary skilled artisan. Amounts may vary from as low as about 1.25 micrograms per dose up to about 20% by weight of the dose depending on the particular enhancer.

The outer shell of the present invention may further include compounds such as antiflatulents to reduce a potential side effect of ingesting mineral supplements containing, for example, a gas producing anion such as carbohydrate or bicarbonate. A preferred antiflatulent is simethicone. The amounts used will vary depending upon the amount of gas that will be produced which varies upon the mineral compound and the amount of it used in the formulation. Such amounts may be readily determined by the ordinary skilled artisan. They may vary from about 15 mg to about 80 mg per piece.

The outer shell may also include further additives utilized in conventional coatings such as pigments, colorants, flavorings and so forth and mixtures of these in varying amounts.

Suitable flavorings include natural and artificial flavors such as mints, peppermint, artificial vanilla, natural vanilla, cinnamon, various fruit flavors, both individual and mixed. The flavorings are generally utilized in amounts that will vary depending upon the individual flavor and may, for example range up to 1% by weight or higher.

The colorants that may be used include pigments such as titanium dioxide and nmay be incorporated in amounts of up to 1% or higher by weight. Also, the colorants may include other dyes suitable for food, drug and cosmetic applications, and known as F.D.&C. dyes and lakes.

The chewing gum composition may be formulated from standard ingredients and by known methods in the art. The composition is comprised of a gum base and such additional additives which would ordinarily be included to comprise a chewing gum composition, i.e., corn syrup, sugar, flavor, fillers and the like.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerine, lecithin, and glyceryl monostearate and the like, may also be incorporated into the gum base to obtain a variety of desirable textures and consistency properties. These additional materials are generally employed in amounts of up to about 30% by weight and preferably in amounts of from about 3% to about 5% by weight of the final gum base composition.

The chewing gum compositions employing the instant gum bases generally contain sweetening agents. The sweetening agent may be selected from a wide range of materials including water-soluble agents, water-soluble artificial sweeteners, and dipeptide based sweerteners, including mixtures thereof. Without being limited to particular sweeteners, representative illustrations encompass:

A. Water-soluble sweetening agents such as monosaccharides, disaccharides and polyaccharides such as xylose, ribose, glucose, mannose, galactose, fructose, dextrose, sucrose, sugar, maltose, partially hydrolyzed starch or corn syrup solids and sugar alcohols such as sorbitol, xylitol, mannitol, hydrogeneated starch hydrolysate and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide sweeteners such as L-aspartylL-phenylalanine methyl ester and materials described in U.S. Pat. No. 3,492,131 and the like.

In general, the amount of sweetener will vary with the desired amount of sweetener selected for a particular chewing gum composition. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and fillers such as aluminum hydroxide, alumina, aluminum silicates, talc, dicalcium phosphate, calcium carbonate, and combinations thereof. Preferably the amount of fillers used is about up to 25% by weight of the gum base.

Flavoring agents well known to the chewing gum art may be added to the chewing gum compositions of the instant invention. These flavoring agents may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed in the chewing gum shell is normally a matter of preference subject to such factors as flavor type, gum base type and strength desired. In general, amounts of about 0.5% to about 3.0% by weight of the final chewing gum composition are useable with amounts of about 0.3% to about 1.5% being preferred and about 0.7% to about 1.2% being most preferred.

The following examples are given to illustrate the invention, but are not deemed to be limiting thereof. All percentages given throughout the specification are based on the weight of the final composition unless otherwise indicated.

EXAMPLE 1

This Example demonstrates the formation of a product of this invention.

The chewing gum composition to be coated was prepared by blending gum base (25%) with 44 Bé corn syrup (13%) and pulverized sugar (63%) and then adding peppermint flavor (1%) to the final mixture until the final chewing gum product was prepared. The homogenous mixture was cooled, rolled into sheets and scored to form a sheet of pillow shaped gum centers or cores.

A coating syrup was prepared by combining water (22.9%), starch (0.8%) and fine granulated sugar (76.3%) and blending the mixture until the coating syrup has a Baumé value between 32 and 37.5.

Gum centers to be coated were placed in sheet form in a standard revolving coating pan and were broken up into individual centers. The centers were dedusted using cool dry air. The coating syrup was heated to 80° C. and the centers coated four times with syrup for 1.5 minutes each while being dried for 4 minutes after the first 3 times with air at approximately 30° C.

The coating syrup from the fourth application was dried until its surface was sticky (approximately 3 minutes) whereupon micronized calcium carbonate having a particle size of 15 microns was added and blended for 1.5 minutes. This procedure was repeated 9 times with both ingredients. The resulting chewing gum piece was then coated with 12 layers of coating syrup having decreasing levels of Baumé values starting at 37.5 and finishing at 32. The resulting product was smooth, non-flaky, crunchy when chewed and did not exhibit a chalky texture.

EXAMPLE 2

The procedure of Example 1 was repeated to prepare a product containing 286.7 milligrams calcium carbonate. The product was subjected to a six member chew-out panel and chewed for 20 minutes whereupon the amount of calcium carbonate removed from the chewing gum was analyzed. A comparative test was run with samples of a commercially available chewing gum product (Chooz TM of Schering-Plourgh Corporation) containing 560 milligrams calcium content and subjected to the same panel test. The results are set forth in Table I and indicate that the average amount of calcium carbonate removed from the inventive product was significantly better than that obtained in the comparative product.

TABLE I

| Sample | Chooz CaCO$_3$ Chew Out | Antacid Gum CaCO$_3$ Chew Out | Chooz CaCO$_3$ % Chew Out | Antacid Gum CaCO$_3$ % Chew Out |
| --- | --- | --- | --- | --- |
| 1 | 405 | 260 | 72.32 | 81.5 |
| 2 | 376 | 251 | 67.14 | 78.7 |
| 3 | 429 | 281 | 76.61 | 88.1 |
| 4 | 422 | 261 | 75.36 | 81.8 |
| 5 | 394 | 291 | 70.36 | 75.5 |
| 6 | 426 | 277 | 76.07 | 86.6 |
| CaCO$_3$ Average | | | | |

TABLE I-continued

| Sample | Chooz CaCO₃ Chew Out | Antacid Gum CaCO₃ Chew Out | Chooz CaCO₃ % Chew Out | Antacid Gum CaCO₃ % Chew Out |
|---|---|---|---|---|
| Chew Out | 408.66 | 261.83 | 72.97 | 82.1 |

The invention being thus described, it will be obvious that the same may be varied in many ways. Such variations are not to be regarded as a departure from the spirit and the scope of the invention and all such modifications are intended to be included within the scope of the claims.

We claim:

1. A chewable mineral supplement which comprises: a chewing gum composition coated with an outer shell containing alternating layers of (1) a mineral compound present in an amount of about 5 to about 60% by weight of the outer shell, which is selected from the group consisting of salts of lithium, sodium, potassium, magnesium, calcium, phosphorous, iron, zinc, and mixtures thereof, and (2) a coating syrup, wherein the mineral compound is present in the outer shell in a ratio of 1:0.5 to 1.5 parts by weight mineral compound to coating syrup and the mineral compound has an average particle size of about 5 to about 75 microns to impart good "mouthfeel" to the chewable mineral supplement, so that the resulting product when chewed exhibits a smooth, non-flaky and crunchy texture.

2. The chewable mineral supplement of claim 1 wherein the mineral compound is a calcium compound selected from the group consisting of calcium gluconate, calcium chloride, calcium lactate, calcium phosphate, monobasic calcium phosphate, dibasic calcium phosphate, tribasic calcium phosphate, calcium carbonate, calcium tartrate, calcium glycerophosphate, calcium levulinate, calcium glycerophosphate, calcium levulinate, calcium hypophosphite, calcium sulfate, calcium gluceptate, calcium chelates, calcium amino acid chelate, ground limestone, ground oyster shells, and mixtures thereof.

3. The chewable mineral supplement of claim 1 wherein the mineral compound is a lithium compound selected from the group consisting of organic and inorganic salts where the anion is chloride, carbonate, citrate, sulfate, bromide and mixtures thereof.

4. The chewable mineral supplement of claim 1 wherein the mineral compound is a sodium-compound selected from the group consisting of organic and inorganic salts of sodium wherein the anionic portion of the salt is acetate, ascorbate, bicarbonate, carbonate, chloride, citrate, hypophosphite, lactate, phosphate monobasic, phosphate dibasic, phosphate tribasic, sulfate, tartrate and mixtures thereof.

5. The chewable mineral supplement of claim 1 wherein the mineral compound is a potassium compound selected from the group consisting of inorganic and organic salts wherein the anionic portion of the salt is acetate, bicarbonate, bitartrate, bromide, carbonate, chloride, citrate, gluconate, phosphate monobasic, phosphate dibasic, phosphate tribasic, sulfate, tartrate and mixtures thereof.

6. The chewable mineral supplement of claim 1 wherein the mineral compound is a magnesium compound selected from the group consisting of organic and inorganic salts of magnesium wherein the anionic portion of the salt is acetate, carbonate, hydroxide, chloride, citrate, dibasic citrate, hydroxide, lactate, oxide, phosphate monobasic, phosphate dibasic, phosphate tribasic, trisilicate, sulfate, as well as the composition formed as the co-precipitated gel of aluminum hydroxide and magnesium carbonate and mixtures thereof.

7. The chewable mineral supplement of claim 1 wherein the mineral compound is an iron compound selected from the group consisting of organic and inorganic salts and chelates of iron such as reduced iron, ferrous sulfate, iron ammonium citrate, ferrous carbonate, ferrous chloride, ferrous fumarate, ferroglycine sulfate, ferronacin, ferrous carbonate mass, ferrous carbonate saccharated, ferrous citrate, ferrous gluconate, ferrous lactate, ferrous sulfate, ferrous succinate, iron chelates, iron chelate with magnesium trisilicate and mixtures thereof.

8. The chewable mineral supplement of claim 1 wherein the mineral compound is a phosphorous compound selected from the group consisting of salts wherein the anionic portion is a phosphate and the cationic portion is sodium, potassium, magnesium, iron, calcium, lithium, zinc and mixtures thereof.

9. The chewable mineral supplement of claim 1 wherein the mineral compound is a zinc compound selected from the group consisting of inorganic salts wherein the anionic portion of the salt is carbonate, chloride, citrate, and mixtures thereof.

10. The chewable mineral supplement of claim 1 wherein the mineral compound is calcium carbonate.

11. The chewable mineral supplement of claim 1 further containing an absorption enhancer in the outer shell.

12. The chewable mineral supplement of claim 11 wherein said absorption enhancer is selected from the group consisting of vitamin D, lysine, arginine, lactose, vitamin D2, vitamin D3, calcitrol and mixtures thereof.

13. The chewable mineral supplement of claim 1 further containing an antiflatulent in the outer shell.

14. The chewable mineral supplement of claim 13 wherein said antiflatulent is simethicone.

15. The chewable mineral supplement of claim 1 wherein the mineral compound has an average particle size of about 10 to about 50 microns.

16. The chewable mineral supplement of claim 1 wherein the coating syrup contains
   (a) about 60 to about 81.9% sweetener,
   (b) about 0.1 to about 5% film forming agent and
   (c) about 18 to about 38% water, all percents are by weight of the coating syrup.

17. The chewable mineral supplement of claim 16 wherein the coating syrup has a Baumé value from about 30 to about 40.

18. The chewable mineral supplement of claim 1 wherein the syrup coating and mineral compound are present in the outer shell in a ratio of about 1:0.5 to 1.5 parts by weight respectively.

19. The chewable mineral supplement of claim 16 wherein the sweetener is selected from the group consisting of sucrose, fructose, maltose, xylitol, sorbitol, mannitol and mixtures thereof.

20. The mineral supplement of claim 1 wherein the mineral compound has an average particle size of about 10 to about 50 microns.

21. The mineral supplement of claim 1 wherein the mineral compound has an average particle size of about 10 to about 30 microns.

22. The mineral supplement of claim 1 wherein the mineral compound is present in the outer shell in an amount of about 20 to about 40% by weight.

23. A process for preparing a chewable mineral supplement; which comprises: applying to a shaped chewing gum composition alternating layers of a (1) powdered mineral compound selected from the group consisting of salts of lithium, sodium, potassium, magnesium, calcium, phosphorous, iron, zinc and mixture thereof, wherein the mineral compound has an average particle size of about 5 to about 75 microns and (2) a coating syrup containing a sweetener, film forming agent and water, thereby forming an outer shell on the shaped gum composition and wherein the mineral compound is present in the outer shell in a ratio of 1:05.5 to 1.5 parts by weight mineral compound to coating syrup.

24. The process of claim 23 wherein the shaped chewing gum composition is first contacted with the coating syrup, the coating syrup is then partially dried so that the resulting piece has a sticky surface, a layer of powdered mineral compound is then applied to the sticky surface present on the chewing gum piece, the piece is dried and the procedure repeated until the desired amount of mineral compound has been applied to the outer shell.

25. The process of claim 23 wherein the mineral compound has an average particle size of about 10 to about 50 microns.

26. The process of claim 23 wherein the coating syrup contains
 (a) about 60% to about 81.9% sweetener
 (b) about 0.1 to about 5% film forming agent, and
 (c) about 18 to about 38% water, all percents are by weight of the coating syrup.

27. The process of claim 26 wherein the coating syrup has a Baumé value from about 30 to about 40.

28. The process of claim 23 wherein the sweetener is selected from the group consisting of sucrose, fructose, maltose, xylitol, sorbitol, mannitol and mixtures thereof.

29. The process of claim 23 wherein the mineral compound is present in amount of about 5 to about 60% by weight of the outer shell.

30. The process of claim 23 wherein the mineral compound is present in the outer shell in an amount of about 20% to about 40% by weight.

31. The process of claim 23 wherein the mineral compound has an average particle size of about 10 to about 30 microns.

32. An antacid composition which comprises: a chewing gum composition coated with an outer shell containing alternating layers of a calcium compound and a coating syrup wherein the calcium component is present in the outer shell in a ratio of 1:0.5 to 1.5 parts by weight calcium compound to coating syrup and wherein the calcium compound is present in an amount of about 5 to about 60% by weight of the outer shell and the calcium compound has an average particle size of about 5 to about 75 microns to impart good "mouthfeel" to the chewable mineral supplement, so that the resulting product when chewed exhibits a smooth, non-flaky and crunchy texture.

33. The antacid composition of claim 32 wherein the calcium compound is selected from the group consisting of calcium gluconate, calcium chloride, calcium lactate, calcium phosphate, monobasic calcium phosphate, dibasic calcium phosphate, tribasic calcium phosphate, calcium carbonate, calcium tartrate, calcium glycerophosphate, calcium levulinate, calcium glycerophosphate, calcium levulinate, calcium hypophosphite, calcium sulfate, calcium gluceptate, calcium chelates, calcium amino acid chelate, ground limestone, ground oyster shells, and mixtures thereof.

* * * * *